US012389203B2

(12) United States Patent
Kadiri et al.

(10) Patent No.: US 12,389,203 B2
(45) Date of Patent: Aug. 12, 2025

(54) MULTICAST RADIO BEARER (MRB) WITH RADIO LINK CONTROL (RLC) RE-TRANSMISSION

(71) Applicant: QUALCOMM Incorporated, San Diego, CA (US)

(72) Inventors: Prasad Reddy Kadiri, San Diego, CA (US); Alberto Rico Alvarino, San Diego, CA (US); Umesh Phuyal, San Diego, CA (US); Le Liu, Fremont, CA (US); Xipeng Zhu, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/393,302

(22) Filed: Aug. 3, 2021

(65) Prior Publication Data

US 2022/0038866 A1 Feb. 3, 2022

Related U.S. Application Data

(60) Provisional application No. 63/060,535, filed on Aug. 3, 2020.

(51) Int. Cl.
*H04W 76/40* (2018.01)
*H04L 1/1812* (2023.01)
(Continued)

(52) U.S. Cl.
CPC ............ *H04W 4/06* (2013.01); *H04L 1/1816* (2013.01); *H04W 72/543* (2023.01); *H04W 76/11* (2018.02); *H04W 76/40* (2018.02)

(58) Field of Classification Search
CPC ............ H04L 1/08; H04W 4/06; H04W 4/40; H04W 52/247; H04W 72/30;
(Continued)

(56) References Cited

U.S. PATENT DOCUMENTS

2009/0022080 A1* 1/2009 Edlund .................... H04W 4/08
370/315
2013/0163444 A1* 6/2013 Tee ........................ H04W 72/30
370/312
(Continued)

FOREIGN PATENT DOCUMENTS

WO WO-2021142702 A1 * 7/2021
WO WO-2021197224 A1 * 10/2021

OTHER PUBLICATIONS

WO2021197224_Machine TRanslation (Year: 2021).*

*Primary Examiner* — Harun Chowdhury
(74) *Attorney, Agent, or Firm* — Kevin M. Donnelly; Seyfarth Shaw LLP

(57) ABSTRACT

A method for wireless communication at a user equipment (UE) includes receiving, from a base station, multicast data via a multicast channel. The method also includes transmitting, to the base station, multicast feedback based on receiving the multicast data. In some examples, the multicast feedback is associated with a group of UEs including the UE. The method further includes receiving, from the base station, a re-transmission of the multicast data on the multicast channel or a unicast channel based on one or more of a number of UEs served by the base station, a number of UEs from the group of UEs providing the multicast feedback, or a radio channel condition.

13 Claims, 13 Drawing Sheets

(51) Int. Cl.
　　 *H04W 4/06*　　　(2009.01)
　　 *H04W 72/543*　　(2023.01)
　　 *H04W 76/11*　　 (2018.01)

(58) Field of Classification Search
　　 CPC ..... H04W 72/542; H04W 76/40; H04W 4/08;
　　　　　　　　　　　　　　　　　　　　　　H04W 72/23
　　 USPC ................................. 370/252, 312, 390, 432
　　 See application file for complete search history.

(56)　　　　　　　　References Cited

U.S. PATENT DOCUMENTS

| | | | |
|---|---|---|---|
| 2018/0049060 A1* | 2/2018 | Fujishiro | H04W 72/30 |
| 2019/0123923 A1* | 4/2019 | Belleschi | H04W 4/40 |
| 2022/0256505 A1* | 8/2022 | Qi | H04W 76/40 |
| 2023/0019024 A1* | 1/2023 | Stare | H04W 72/30 |

* cited by examiner

MULTICAST RADIO BEARER (MRB) WITH RADIO LINK CONTROL (RLC) RE-TRANSMISSION

CROSS-REFERENCE TO RELATED APPLICATION

The present application claims the benefit of U.S. Provisional Patent Application No. 63/060,535, filed on Aug. 3, 2020, and titled "MULTICAST RADIO BEARER (MRB) WITH RADIO LINK CONTROL (RLC) RE-TRANSMISSION," the disclosure of which is expressly incorporated by reference in its entirety

FIELD OF THE DISCLOSURE

Aspects of the present disclosure generally relate to wireless communications, and more particularly to techniques and apparatuses for a multicast radio bearer (MRB) with radio link control (RLC) re-transmissions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Radio access technologies (RATs) may support various types of communication, such as unicast, broadcast, and multicast. For unicast communication, a base station transmits data to a single UE. For broadcast communication, the base station transmits data to all UEs in a coverage area. Additionally, for multicast communication, the base station transmits data to a group of UEs (for example, two or more UEs). Unicast, broadcast, and multicast communications may support different communication service verticals, such as vehicle-to-everything (V2X), industrial Internet of things (IIOT), or extended reality (XR). Additionally, unicast, broadcast, and multicast communications may be associated with different quality of service (QoS) specifications.

SUMMARY

In one aspect of the present disclosure, a method for wireless communication at a user equipment (UE) is presented. The method includes receiving, from a base station, multicast data via a multicast channel. The method further includes transmitting, to the base station, multicast feedback based on receiving the multicast data. In some examples, the UE is associated with a set of UEs, and the set of UEs are associated with a multicast transmission of the multicast data from the base station. The method still further includes receiving, from the base station, a re-transmission of the multicast data on the multicast channel or a unicast channel based on one or more of a number of UEs served by the base station, a number of multicast feedback transmissions from the set of UEs, or a radio channel condition.

Another aspect of the present disclosure is directed to an apparatus including means for receiving, from a base station, multicast data via a multicast channel. The apparatus further includes means for transmitting, to the base station, multicast feedback based on receiving the multicast data. In some examples, the UE is associated with a set of UEs, and the set of UEs are associated with a multicast transmission of the multicast data from the base station. The apparatus still further includes means for receiving, from the base station, a re-transmission of the multicast data on the multicast channel or a unicast channel based on one or more of a number of UEs served by the base station, a number of multicast feedback transmissions from the set of UEs, or a radio channel condition.

In another aspect of the present disclosure, a non-transitory computer-readable medium with non-transitory program code recorded thereon is disclosed. The program code is executed by a processor and includes program code to receive, from a base station, multicast data via a multicast channel. The program code further includes program code to transmit, to the base station, multicast feedback based on receiving the multicast data. In some examples, the UE is associated with a set of UEs, and the set of UEs are associated with a multicast transmission of the multicast data from the base station. The program code still further includes program code to receive, from the base station, a re-transmission of the multicast data on the multicast channel or a unicast channel based on one or more of a number of UEs served by the base station, a number of multicast feedback transmissions from the set of UEs, or a radio channel condition.

Another aspect of the present disclosure is directed to an apparatus having a memory and a processor, a memory coupled with the processor, and instructions stored in the memory and operable, when executed by the processor, to cause the apparatus to receive, from a base station, multicast data via a multicast channel. Execution of the instructions further cause the apparatus to transmit, to the base station, multicast feedback based on receiving the multicast data. In some examples, the UE is associated with a set of UEs, and the set of UEs are associated with a multicast transmission of the multicast data from the base station. Execution of the instructions also cause the apparatus to receive, from the base station, a re-transmission of the multicast data on the multicast channel or a unicast channel based on one or more of a number of UEs served by the base station, a number of multicast feedback transmissions from the set of UEs, or a radio channel condition.

In one aspect of the present disclosure, a method for wireless communication at a base station is presented. The method includes transmitting, to a set of UEs, multicast data via a multicast channel. The method further includes receiving, from one or more UEs of the set of UEs, multicast feedback associated with a first access stratum layer. In some examples, the feedback is received based on transmitting the multicast data. The method still further includes re-transmitting, to the one or more UEs of the set of UEs, the multicast data on the multicast channel or a unicast channel based on one or more of a number of UEs served by the base station, a number of multicast feedback transmissions from the set of UEs, or a radio channel condition. In some examples, the multicast channel or the unicast channel is selected at a second access stratum layer based on identifying the first access stratum layer.

Another aspect of the present disclosure is directed to an apparatus including means for transmitting, to a set of UEs, multicast data via a multicast channel. The apparatus further includes means for receiving, from one or more UEs of the set of UEs, multicast feedback associated with a first access stratum layer. In some examples, the feedback is received based on transmitting the multicast data. The apparatus still further includes means for re-transmitting, to the one or more UEs of the set of UEs, the multicast data on the multicast channel or a unicast channel based on one or more of a number of UEs served by the base station, a number of multicast feedback transmissions from the set of UEs, or a radio channel condition. In some examples, the multicast channel or the unicast channel is selected at a second access stratum layer based on identifying the first access stratum layer.

In another aspect of the present disclosure, a non-transitory computer-readable medium with non-transitory program code recorded thereon is disclosed. The program code is executed by a processor and includes program code to transmit, to a set of UEs, multicast data via a multicast channel. The program code further includes program code to receive, from one or more UEs of the set of UEs, multicast feedback associated with a first access stratum layer. In some examples, the feedback is received based on transmitting the multicast data. The program code still further includes program code to re-transmit, to the one or more UEs of the set of UEs, the multicast data on the multicast channel or a unicast channel based on one or more of a number of UEs served by the base station, a number of multicast feedback transmissions from the set of UEs, or a radio channel condition. In some examples, the multicast channel or the unicast channel is selected at a second access stratum layer based on identifying the first access stratum layer.

Another aspect of the present disclosure is directed to an apparatus having a memory and a processor, a memory coupled with the processor, and instructions stored in the memory and operable, when executed by the processor, to cause the apparatus to transmit, to a set of UEs, multicast data via a multicast channel. Execution of the instructions also cause the apparatus to receive, from one or more UEs of the set of UEs, multicast feedback associated with a first access stratum layer. In some examples, the feedback is received based on transmitting the multicast data. Execution of the instructions further cause the apparatus to re-transmit, to the one or more UEs of the set of UEs, the multicast data on the multicast channel or a unicast channel based on one or more of a number of UEs served by the base station, a number of multicast feedback transmissions from the set of UEs, or a radio channel condition. In some examples, the multicast channel or the unicast channel is selected at a second access stratum layer based on identifying the first access stratum layer.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
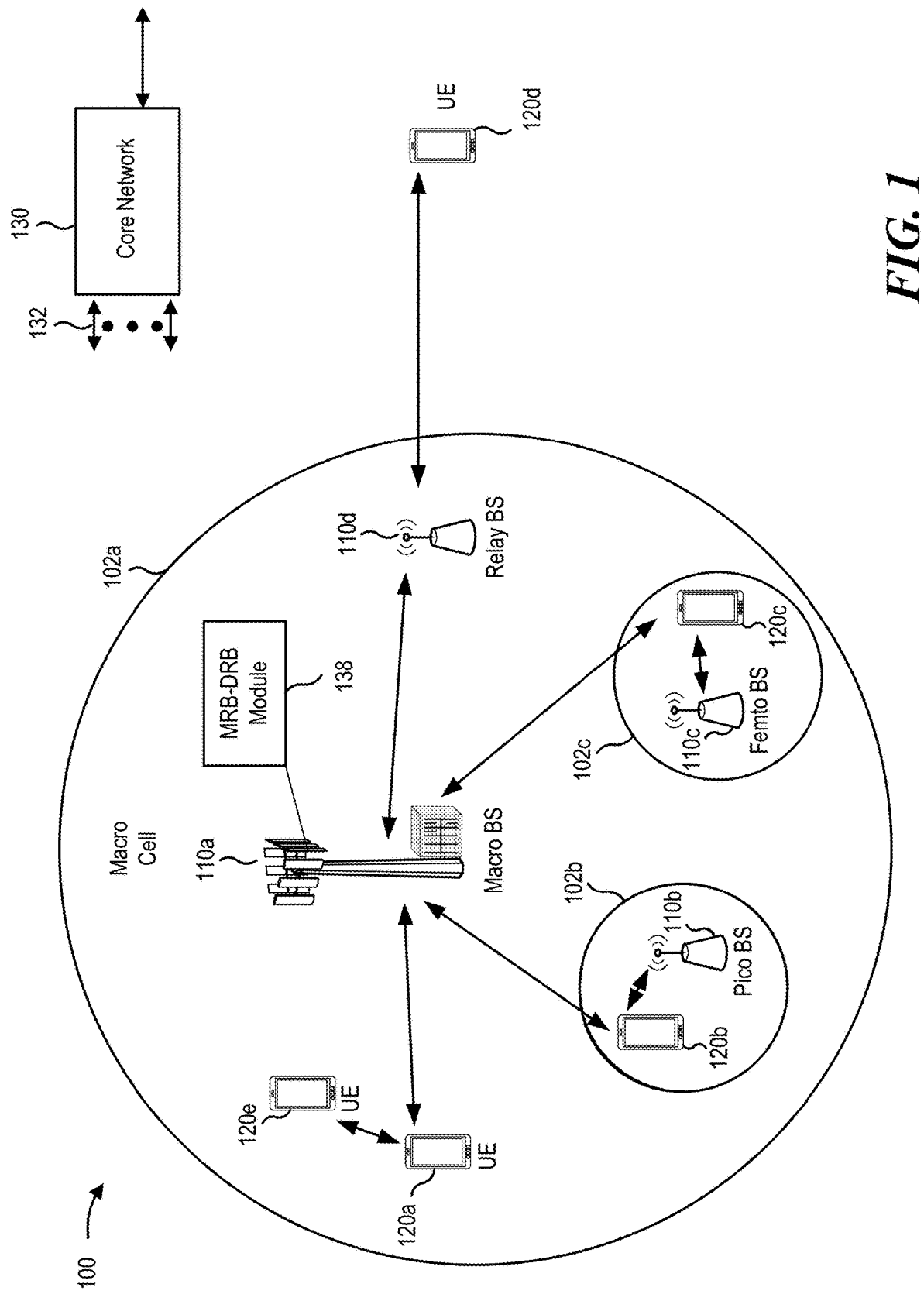
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and 4G technologies.

As described, radio access technologies (RATs), such as 5G new radio (NR), may support various types of communication, such as unicast, broadcast, and multicast. For unicast communication, a base station transmits data to a single user equipment (UE). For broadcast communication, the base station transmits data to all UEs in a coverage area. Additionally, for multicast communication, the base station transmits data to a group of UEs. The group of UEs may be an example of a set of UEs associated with a multicast transmission. Unicast, broadcast, and multicast communications may support different communication service verticals, such as vehicle-to-everything (V2X), industrial Internet of things (IIOT), or extended reality (XR). Additionally, unicast, broadcast, and multicast communications may be associated with different quality of service (QoS) specifications.

In some wireless communication systems, a base station may switch between multicast transmissions and unicast transmissions. In some examples, the base station may map multicast data to either a unicast data radio bearer (DRB) or multicast radio bearer (MRB) based on a QoS associated with the multicast data. In some such examples, an initial multicast data transmission may be based on the mapping. As an example, the multicast data may be transmitted via a multicast channel based on the multicast data being mapped to the MRB. As another example, the multicast data may be transmitted via a unicast channel based on the multicast data being mapped to the DRB.

Aspects of the present disclosure are directed to re-transmitting multicast data in response to feedback received from one or more UEs. In some examples, the one or more UEs may provide hybrid automatic repeat request (HARQ) feedback, packet data convergence protocol (PDCP) feedback, or radio link control (RLC) status feedback to a base station based on receiving an initial multicast data transmission on a multicast channel associated with an MRB. In such examples, the base station may identify an access stratum layer, such as an RLC layer, a PDCP layer, or a medium access control (MAC) layer, associated with the feedback received from the one or more UEs. The base station may then select a re-transmission channel and re-transmit the multicast data via the re-transmission channel based on receiving the feedback from the UE. The re-transmission channel may be the multicast channel or a unicast channel associated with a DRB. The base station may select the re-transmission channel at the RLC layer or the MAC layer based on an access stratum layer associated with the feedback. In some examples, the base station may select the multicast channel or the unicast channel for re-transmitting the multicast data based on one or more of a number of UEs served by the base station, a number of UEs providing multicast feedback, or a radio channel condition.

Particular aspects of the subject matter described in this disclosure can be implemented to realize one or more of the following potential advantages. In some examples, network overhead and latency may be reduced by selecting an appropriate re-transmission channel (for example, the unicast channel or the multicast channel) for a multicast data re-transmission. By selecting the appropriate re-transmission channel for the multicast data re-transmission, some aspects of the present disclosure may also maintain service continuity for multicast data transmitted from the base station.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, an NR BS, a Node B, a gNB, a 5G node B (NB), an access point, a transmit and receive point (TRP), and the like. Each BS may provide communications coverage for a particular geographic area. In 3GPP, the term "cell" can refer to a coverage area of a BS and a BS subsystem serving this coverage area, depending on the context in which the term is used.

A BS may provide communications coverage for a macro cell, a pico cell, a femto cell, and another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and to one or more other BSs or network nodes (not shown) in the wireless network 100 through various types of backhaul interfaces such as a direct physical connection, a virtual network, and the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and the like.

The wireless network 100 may be a heterogeneous network that includes BSs of different types, for example, macro BSs, pico BSs, femto BSs, relay BSs, and the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130). The UEs 120 (for example, 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The core network 130 or the base stations 110 may include a multicast radio bearer-unicast data radio bearer (MRB-DRB) module 138 for transmitting, to one or more UEs 120, multicast data via a multicast channel and receiving, from the one or more UEs 120, feedback in response to transmitting the multicast data. The MRB-DRB module 138 may also identify a first access stratum layer associated with the feedback. The MRB-DRB module 138 may further select a unicast channel or the multicast channel for a re-transmission at a second access stratum layer in response to identifying the first access stratum layer. Additionally, the MRB-DRB module 138 may re-transmit, to the one or more UEs 120, the multicast data via the multicast channel or the unicast channel based on the selection.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet of things (IoT) devices, and may be implemented as NB-IoT (narrowband Internet of things) devices. Some UEs may be considered a customer premises equipment (CPE). UE 120 may be included inside a housing that houses components of UE 120, such as processor components, memory components, and the like.

In general, any number of wireless networks may be deployed in a given geographic area. Each wireless network may support a particular RAT and may operate on one or more frequencies. A RAT may also be referred to as a radio technology, an air interface, and the like. A frequency may also be referred to as a carrier, a frequency channel, and the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and the like), a mesh network, and the like. In this case, the UE 120 may perform scheduling operations, resource selection operations, and other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB)).

Figure 2:
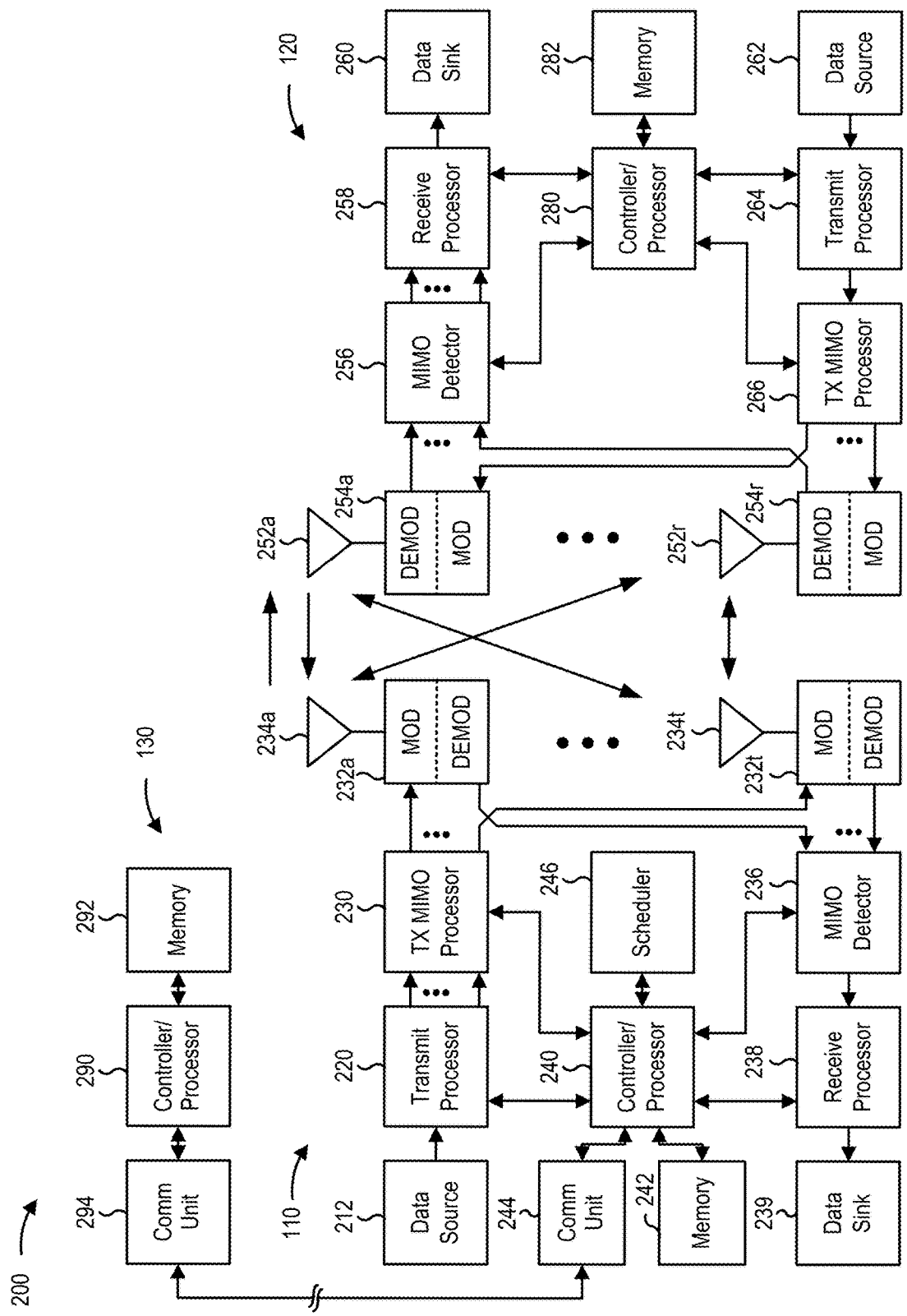
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and the like) and control information (for example, CQI requests, grants, upper layer signaling, and the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and the reference symbols, if applicable, and may provide T output symbol streams to T modulators (MODs) 232a through 232t. Each modulator 232 may process a respective output symbol stream (for example, for OFDM and the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and any other component(s) of FIG. 2 may perform one or more techniques associated with selecting a unicast channel or a multicast channel for re-transmission of multicast data as described in more detail elsewhere. For example, the controller/processor 240 of the base station 110, the controller/processor 280 of the UE 120, and any other component(s) of FIG. 2 may perform or direct operations of, for example, the process of FIGS. 12-13 and other processes as described. Memories 242 and 282 may store data and program codes for the base station 110 and UE 120, respectively. A scheduler 246 may schedule UEs for data transmission on the downlink and uplink.

Figure 3:
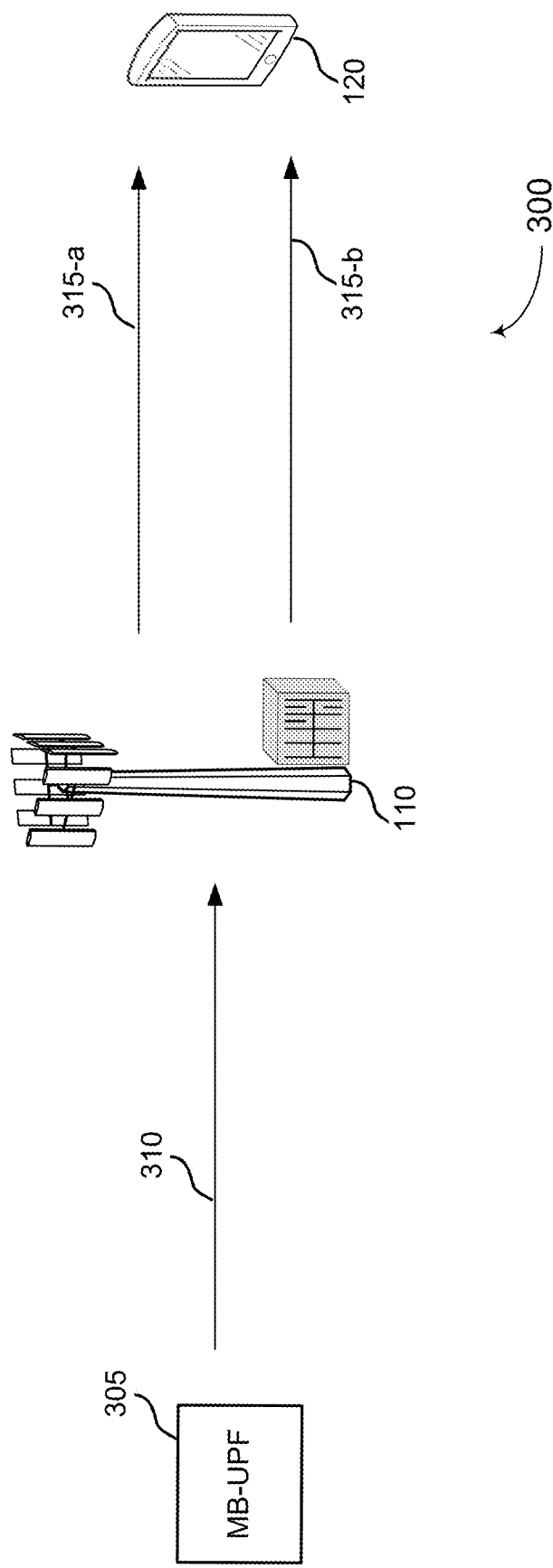
FIG. 3 is a diagram illustrating an example of a wireless communication system that supports delivery of broadcast services using different radio bearer modes, in accordance with aspects of the present disclosure.

FIG. 3 is a diagram illustrating an example of a wireless communication system 300 that supports delivery of broadcast services using different radio bearer modes, in accordance with aspects of the present disclosure. In some examples, the wireless communication system 300 may implement aspects of the wireless network 100, as described with respect to FIG. 1. The wireless communication system 300 includes a base station 110 and a UE 120, which may be examples of the corresponding devices of FIG. 1. The wireless communication system 300 further includes a multicast/broadcast user plane function (MB-UPF) 305. The MB-UPF 305 may be a component of a core network, such as the core network 130 described with respect to FIG. 1. The core network (not shown in FIG. 3) may provide packet classification, aggregation, forwarding, routing, policy enforcement, and data buffering functionality, as well as other functions.

The MB-UPF 305 may provide multicast QoS flow indications to the base station 110 to transmit multicast data 310 to one or more UEs 120 during a multicast protocol data unit (PDU) session. The base station 110 may select a radio bearer for delivery of the multicast data 310 to the one or more UEs 120. The radio bearers may include an MRB and a DRB. The base station may select the radio bearer based on an indication received from the MB-UPF 305. For example, the indication may identify a multicast data QoS flow, which may be associated with a QoS level.

In one implementation, the base station 110 (for example, RAN) selects the MRB or DRB based on a mapping of the multicast data 310 to the multicast data QoS flow. For example, the base station 110 may select the MRB for transmission of the multicast data 310 in response to identifying a group of UEs for the multicast data 310 and also based on multicast QoS flow characteristics. In this example, the base station 110 selects the MRB to transmit the multicast data 310 to the UE 120 via a multicast channel 315-*a*. In another example, the base station 110 may determine that only one UE or a subset of UEs from a group of UEs are to receive the multicast data 310, for example, some UEs may not support receiving multicast data via the MRB. In this example, the base station 110 selects the DRB for transmitting multicast data 310 to the UE 120 via a unicast channel 315-*b*.

In one implementation, for a mixed transmission mode (for example, a multicast and unicast delivery mode), from a perspective of the core network (for example, MB-UPF 305), the UE 120 is expected to be in a connected mode, such as a 5G non-access stratum (NAS) connection management (CM)-CONNECTED mode, to receive downlink (DL) transmissions. From a radio perspective (for example, from the perspective of the base station 110), the UE 120 may need to be in a connected state, such as an RRC_CONNECTED state. In the RRC_CONNECTED state, the UE 120 may provide HARQ feedback, PDCP feedback, and RLC status feedback. The feedback may be multicast feedback or unicast feedback. As described, the base station 110 may perform re-transmissions, such as L1 HARQ or L2 automatic repeat request (ARQ) re-transmissions, via the unicast channel 315-*b* or the multicast channel 315-*a* based on the feedback. Aspects of the present disclosure improve reliability of re-transmissions by selecting the unicast channel 315-*b* or the multicast channel 315-*a* for re-transmitting multicast data based on the feedback provided by the UE 120.

In some implementations, the base station 110 may notify the UE 120 of a switch between the unicast channel 315-*b* (for example, DRB) or the multicast channel 315-*a* (for example, MRB), or vice versa, using RRC or MAC-control element (CE) or downlink control channel DCI signaling. In other implementations, the base station switches radio bearers without transmitting a notification to the UE 120.

Figure 4:
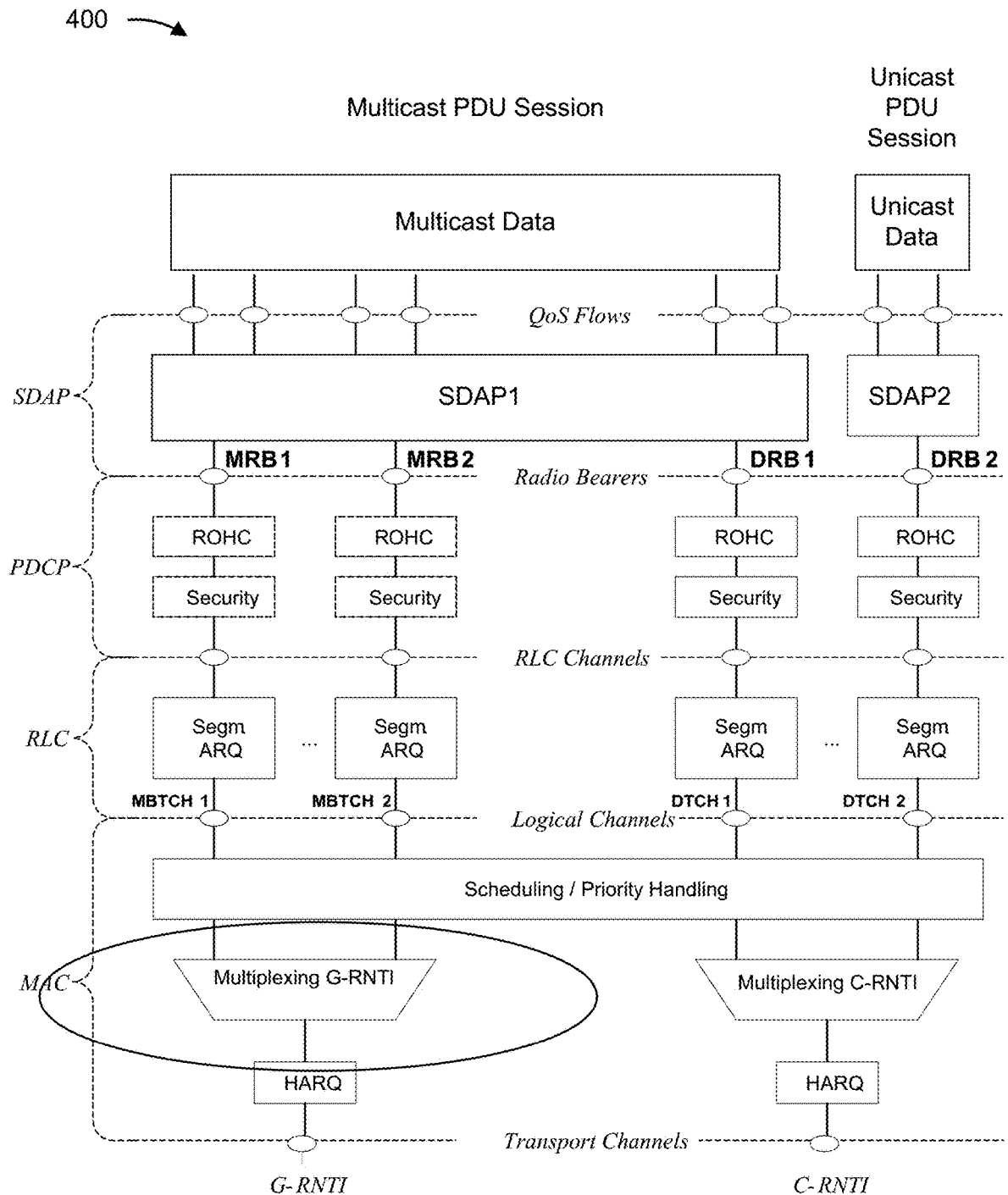
FIG. 4 is a block diagram illustrating an example architecture for mapping multiple multicast radio bearers (MRBs) to a multicast channel at a base station, in accordance with aspects of the present disclosure.

FIG. 4 is a block diagram illustrating an example architecture 400 for mapping multiple MRBs to a multicast channel at a base station, in accordance with aspects of the present disclosure. In FIG. 4, the architecture 400 includes multiple access stratum layers, such as a service data adaptation protocol (SDAP) layer, a PDCP layer, a RLC layer, and a MAC layer.

The SDAP layer maps data, such as multicast data or unicast data, received from the core network (not shown in FIG. 4) to one of the radio bearers, such as an MRB (shown as MRB1 and MRB2) and a DRB (shown as DRB1 and DRB2) within a same PDU session. In the example of FIG. 4, a first SDAP entity (shown as SDAP1) maps the multicast data to MRB1, MRB2, or DRB1. SDAP1 may map the multicast data to additional MRBs and DRBs. Aspects of the present disclosure are not limited to the number of MRBs and DRBs shown in FIG. 4. Additionally, a second SDAP entity (shown as SDAP2) maps the unicast data received from a unicast PDU session to one or more DRBs (for example, DRB2 of FIG. 4).

The PDCP layer may optionally perform robust header compression (RoHC) functions and security functions, as well as other functions. The PDCP layer communicates with the RLC layer via an RLC channel. The RLC layer may contain segments and reassemble packet segmentation as well as perform ARQ error control procedures (shown as Segm. ARQ in FIG. 4). The RLC sublayer may be configured to support different transmission modes, such as an unacknowledged mode (UM) and an acknowledged mode (AM).

The MAC layer may include a scheduler for scheduling and prioritizing packets received from the RLC layer via logical channels, such as a multicast broadcast traffic channel (MBTCH) (shown as MBTCH1 and MBTCH2 in FIG. 4) and a dedicated traffic channel (DTCH) (shown as DTCH1 and DTCH2 in FIG. 4). That is, separate logical channels differentiate multicast data from unicast data. The same type of transport channel, such as a downlink shared channel, may transmit the multicast data and the unicast data. As described below, different scrambling techniques may scramble the transport channel based on whether the transmitted data is multicast data or unicast data.

In one configuration, the MAC scheduler is a common scheduler for multicast data. In another configuration, the MAC scheduler is an independent scheduler for unicast data. The MAC layer may also perform HARQ procedures. The base station may receive feedback, such as HARQ feedback, from a UE in an RRC_CONNECTED state. Additionally, the base station does not receive feedback while the UE is an RRC_IDLE or RRC_INACTIVE state.

In the example of FIG. 4, the base station receives multicast data (for example, multicast QoS flow data) from the UPF through a multicast PDU session. The UPF may send multiple multicast QoS flows within a same multicast PDU session shared across multiple UEs. The base station may dynamically determine whether to use a unicast DRB, such as DRB1, or multicast MRBs, such as MRB1 or MRB2, for multicast data delivery. Different multicast QoS flows may have different reliability and latency specifications.

In one configuration, the multicast QoS flows may have a one to one mapping to an MRB or DRB. That is, each multicast QoS flow may be individually mapped to an MRB or DRB by the SDAP entity, such as SDAP1. In another configuration, a set of multicast QoS flows may be mapped to one MRB or DRB.

In the example of FIG. 4, the MAC layer may multiplex multiple MRBs to the downlink shared channel (shown as a transport channel in FIG. 4), such as a physical downlink shared channel (PDSCH). In one configuration, a channel for transmitting multicast data, such as a downlink shared channel, may be scrambled with a group radio network temporary identifier (G-RNTI). Additionally, a channel for transmitting the unicast data, such as the downlink shared channel, may be scrambled with a cell radio network temporary identifier (C-RNTI).

As described above, aspects of the present disclosure improve a reliability of multicast data transmissions. In some implementations, the base station may maintain service continuity for multicast data transmitted in a given cell by switching from one radio bearer mode (for example, MRB) to another radio bearer mode (for example, DRB) based on one or more of UE mobility (for example, the UE moving from one cell that supports one radio bearer mode to another cell that supports another radio bearer mode), base station capability (for example, whether the base station supports the MRB), a number of UEs served by a base station, UE capability (for example, whether the UE supports the MRB), a total number of UEs of a group of UEs providing multicast feedback, radio channel conditions, or coverage conditions. In some examples, an MRB enabled base station may switch from the MRB to the DRB prior to a handover from the MRB enabled base station to a base station that does not support MRBs. In other examples, the MRB enabled base station may switch to the DRB when only a number of UEs using the multicast service of the MRB enabled base station is less than a total UE threshold. In one such example, the MRB enabled base station may switch to the DRB when only one UE is using the multicast service of the MRB enabled base. In some such examples, one or more UEs may leave a coverage area of the MRB enabled base station, such that a number of UEs using the multicast service is less than a multicast threshold. In some other examples, the MRB enabled base station may switch from the DRB to the MRB when multiple UEs join the multicast service, thereby increasing a total number of UEs served by the MRB enabled base station. In such examples, the total number of UEs served by the MRB enabled base station may be equal to or greater than a served UE threshold. In yet another example, the MRB enabled base station may switch from the MRB to the DRB when the total number of UEs of the group of UEs providing multicast feedback is less than a UE threshold. In such an example, a small number of UEs may provide a negative acknowledgment, therefore, the base station may switch to the DRB to reduce overhead and latency. In some examples, a UE may move away from a base station's multicast beam coverage area. In such examples, the base station may switch the radio bearer to serve the UE via a unicast beam.

In some implementations, the base station may switch from one radio bearer mode to another radio bearer mode prior to an initial multicast data transmission. As an example, the base station may switch one radio bearer mode to another radio bearer mode prior to an initial multicast data transmission based on the UE moving from a cell that supports multicast transmissions to a cell that does not support multicast transmissions. Additionally, or alternatively, the base station may switch from one radio bearer mode to another radio bearer mode prior to re-transmitting multicast data. In some examples, the base station uses one radio bearer (for example, the MRB) for the initial multicast data transmission and another radio bearer (for example, the DRB) for the re-transmission of the multicast data.

Figure 5:
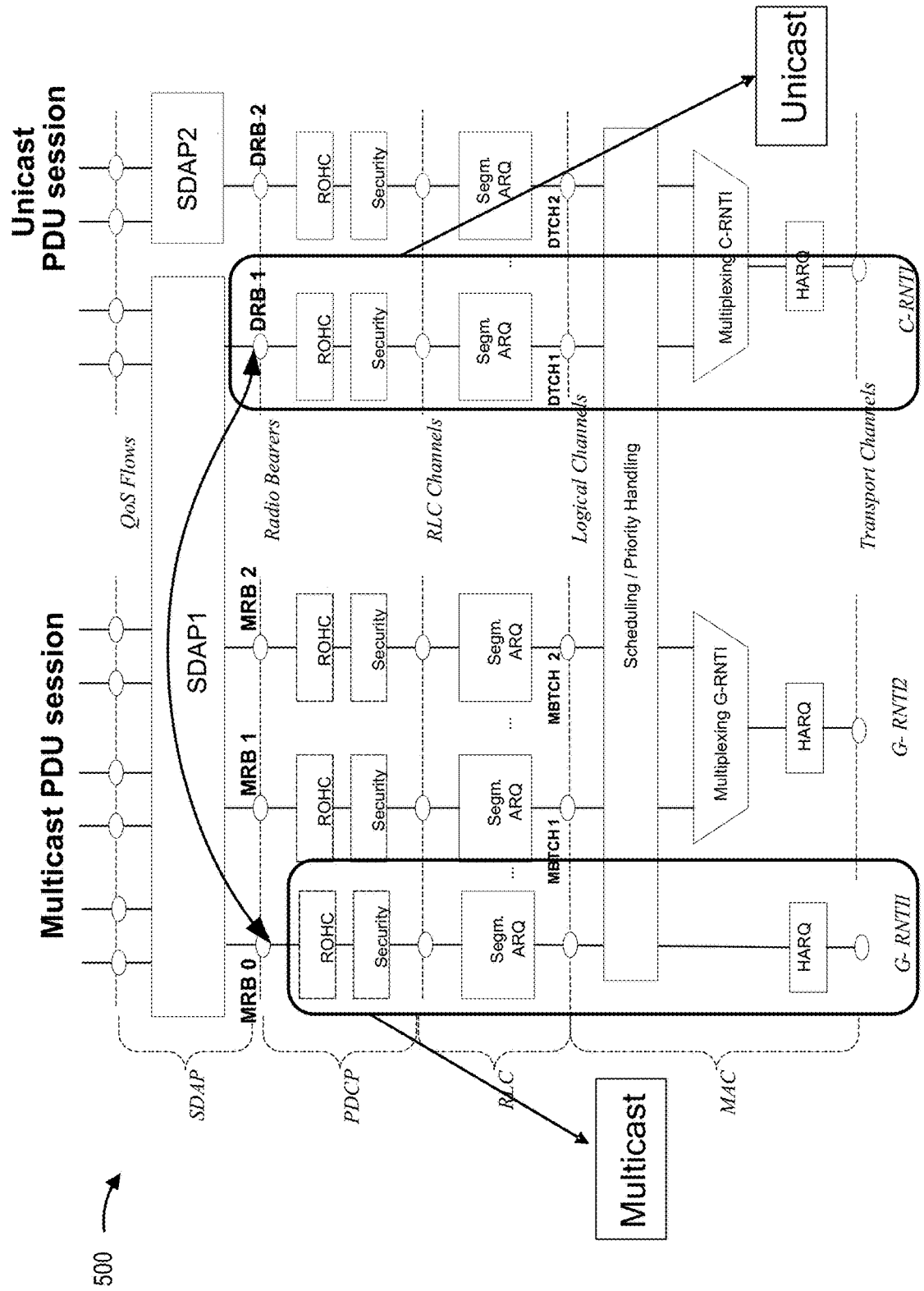
FIG. 5 is a block diagram illustrating an example architecture for switching between radio bearer modes at a base station, in accordance with aspects of the present disclosure.

FIG. 5 is a block diagram illustrating an example architecture 500 for switching between radio bearer modes at a base station, in accordance with aspects of the present disclosure. The architecture 500 of FIG. 5 is based on the architecture 400 described with respect to FIG. 4. The architecture 500 includes an additional MRB access stratum (shown as MRB0) that is not multiplexed at the MAC layer with other MRBs. Similar to the architecture 400 described with respect to FIG. 4, in the architecture 500 of FIG. 5, separate non-access stratum (NAS) PDU sessions, such as the multicast PDU session and the unicast PDU session, are designated for multicast and unicast traffic. Additionally, a separate SDAP, for example, SDAP1 and SDAP2, are designated for the different NAS PDU sessions. In the example of FIG. 5, SDAP1 may map a multicast QoS flow to either the MRB or DRB during the multicast PDU session.

In the example of FIG. 5, an RRC configuration may map the MRB to the DRB. That is, the base station may notify the UE of a switch from the DRB to the MRB, or vice versa, using RRC signaling or MAC-CE signaling. Transmitting an indication of the switch between the MRB and the DRB via control signaling may be an example of a hard switch. In this example, the hard switch maintains service continuity.

In some implementations, the base station may dynamically switch from one radio bearer mode to another radio bearer mode prior to one or both of an initial multicast data transmission or a multicast data re-transmission. In such implementations, a transmission or re-transmission channel may be associated with each radio bearer mode. In some examples, the MRB may be associated with a multicast channel and the DRB may be associated with a unicast channel. In such examples, the base station may select a transmission or re-transmission channel based on selecting, or switching, the radio bearer mode. In some examples, the base station may select a radio bearer mode at an access stratum (AS) layer, such as an RLC layer or MAC layer, based on an AS layer of the feedback received from the UE. In one example, the MAC layer selects the radio bearer mode. In such an example, the radio bearer mode is selected at the MAC layer based on the feedback being HARQ feedback or RLC feedback.

Figure 6:
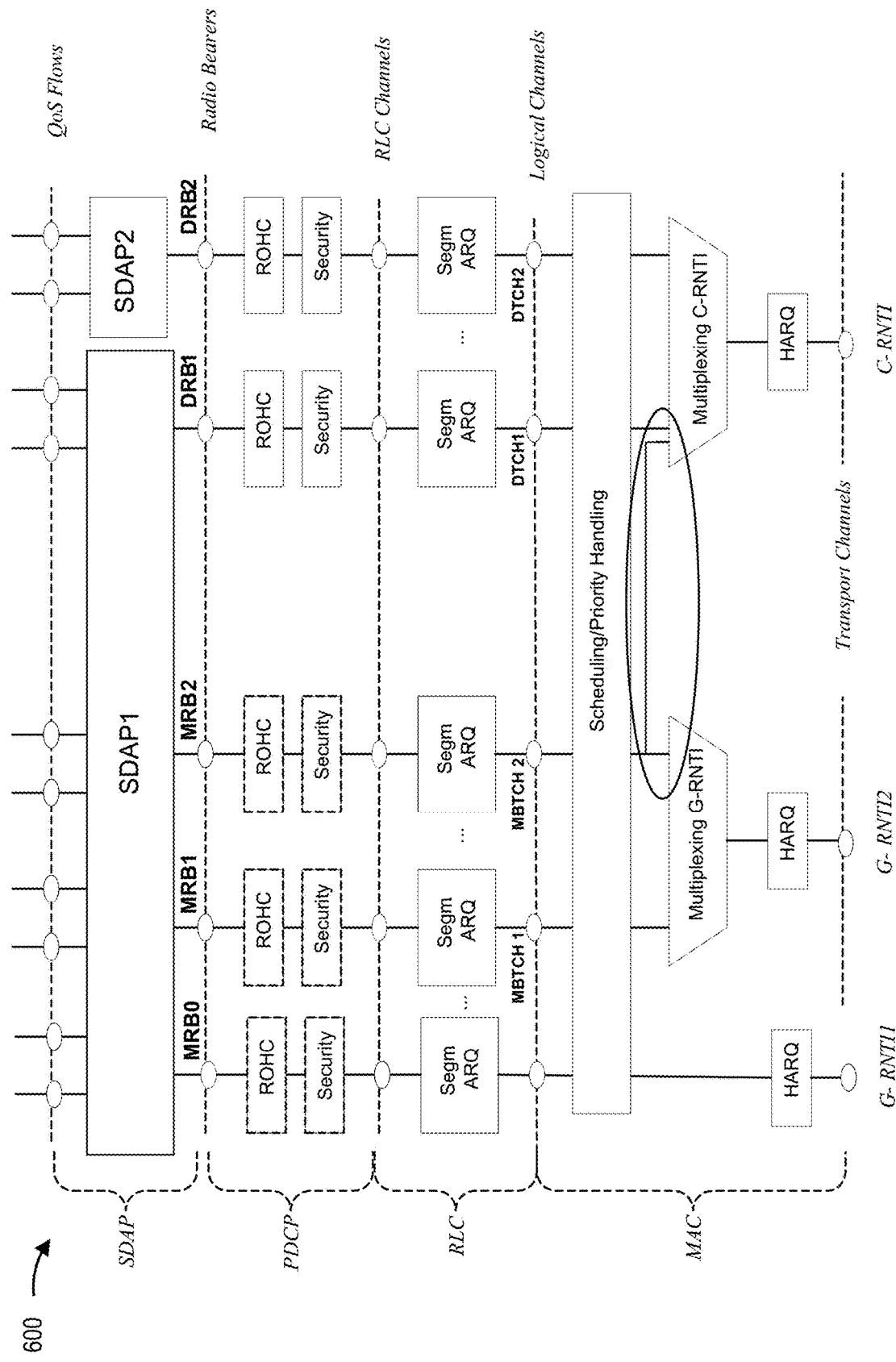
FIG. 6 is a block diagram illustrating an example architecture for switching between radio bearer modes at a medium access control (MAC) layer of a base station, in accordance with aspects of the present disclosure.

FIG. 6 is a block diagram illustrating an example architecture 600 for switching between radio bearer modes at a MAC layer of a base station, in accordance with aspects of the present disclosure. The architecture 600 of FIG. 6 is based on the architecture 500 described with respect to FIG. 5. In the example of FIG. 6, the RLC layer may support the AM mode or the UM mode. The base station may perform RLC layer re-transmissions when operating in the AM mode. That is, the base station may initiate an RLC re-transmission in response to receiving RLC layer feedback from the UE. The base station may initiate RLC re-transmission of the multicast data at the RLC layer and feed it through the MBTCH (for example, MBTCH2 of FIG. 6) logical channel to the MAC layer. Thus, the re-transmission may be associated with a single logical channel ID (LCID).

In the example of FIG. 6, the MAC layer decides whether to send RLC re-transmission via a unicast channel or a multicast channel. In some examples, a multicast transmission may be associated with the G-RNTI and the unicast transmission may be associated with the C-RNTI. In such examples, either a G-RNTI HARQ process or a C-RNTI HARQ process may perform the RLC re-transmission. In such examples, the base station may not dynamically switch re-transmissions associated with a same HARQ process between the multicast channel and the unicast channel. That is, for a given HARQ process, the base station performs all re-transmissions via a same type of HARQ process (for example, either the G-RNTI HARQ process or the C-RNTI HARQ process). In this example, the UE may not soft combine a re-transmission received via the multicast channel with a re-transmission received via the unicast channel. The example of FIG. 6 is not limited to RLC re-transmissions, the architecture 600 also supports HARQ re-transmissions and PDCP re-transmissions.

Figure 7:
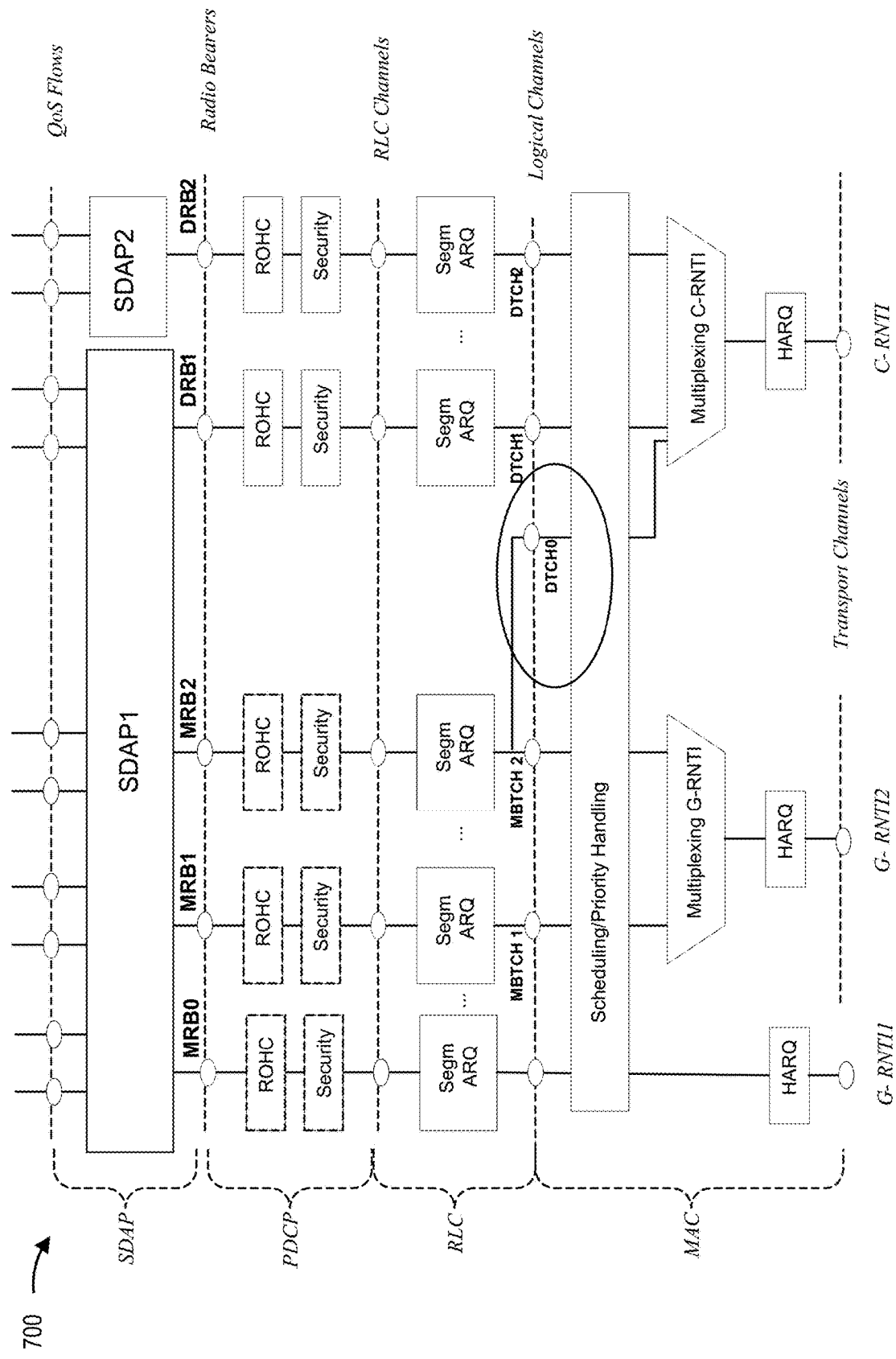
FIG. 7 is a block diagram illustrating an example architecture for selecting a radio bearer mode at a radio link control (RLC) layer of a base station, in accordance with aspects of the present disclosure.

As described above, the base station selects a radio bearer mode for a re-transmission at one of the AS layers. In one implementation, the base station selects the radio bearer mode for the re-transmission at the RLC layer based on receiving RLC feedback. FIG. 7 is a block diagram illustrating an example architecture 700 for selecting a radio bearer mode at an RLC layer of a base station, in accordance with aspects of the present disclosure. The architecture 700 of FIG. 7 is based on the architecture 500 described with respect to FIG. 5. In the example of FIG. 7, the RLC layer may support the AM mode or the UM mode. The base station may perform RLC layer re-transmissions when operating in the AM mode. That is, the base station may initiate an RLC re-transmission in response to receiving RLC layer feedback from the UE. In the example of FIG. 7, the RLC layer determines whether the RLC re-transmission of the multicast data is a multicast re-transmission transmitted via the multicast logical channel or a unicast re-transmission transmitted via the unicast logical channel. In this example, the RLC layer maps the multicast re-transmission to a multicast LCID (MBTCH2) and maps the unicast re-transmission to a unicast LCID (DTCH0).

In the example of FIG. 7, based on the selected LCID type, the base station may map the RLC re-transmission to a HARQ process associated with either the G-RNTI or the C-RNTI. In this example, the base station may not dynamically switch re-transmissions associated with the same HARQ process between the multicast channel and the unicast channel. That is, for a given HARQ process, the base station performs all re-transmissions via a same type of HARQ process associated with either the G-RNTI or the C-RNTI. In this example, the UE may not soft combine a re-transmission received via the multicast channel with a re-transmission received via the unicast channel. The example of FIG. 7 is not limited to RLC re-transmissions, the architecture 700 also supports HARQ re-transmissions.

Figure 8:
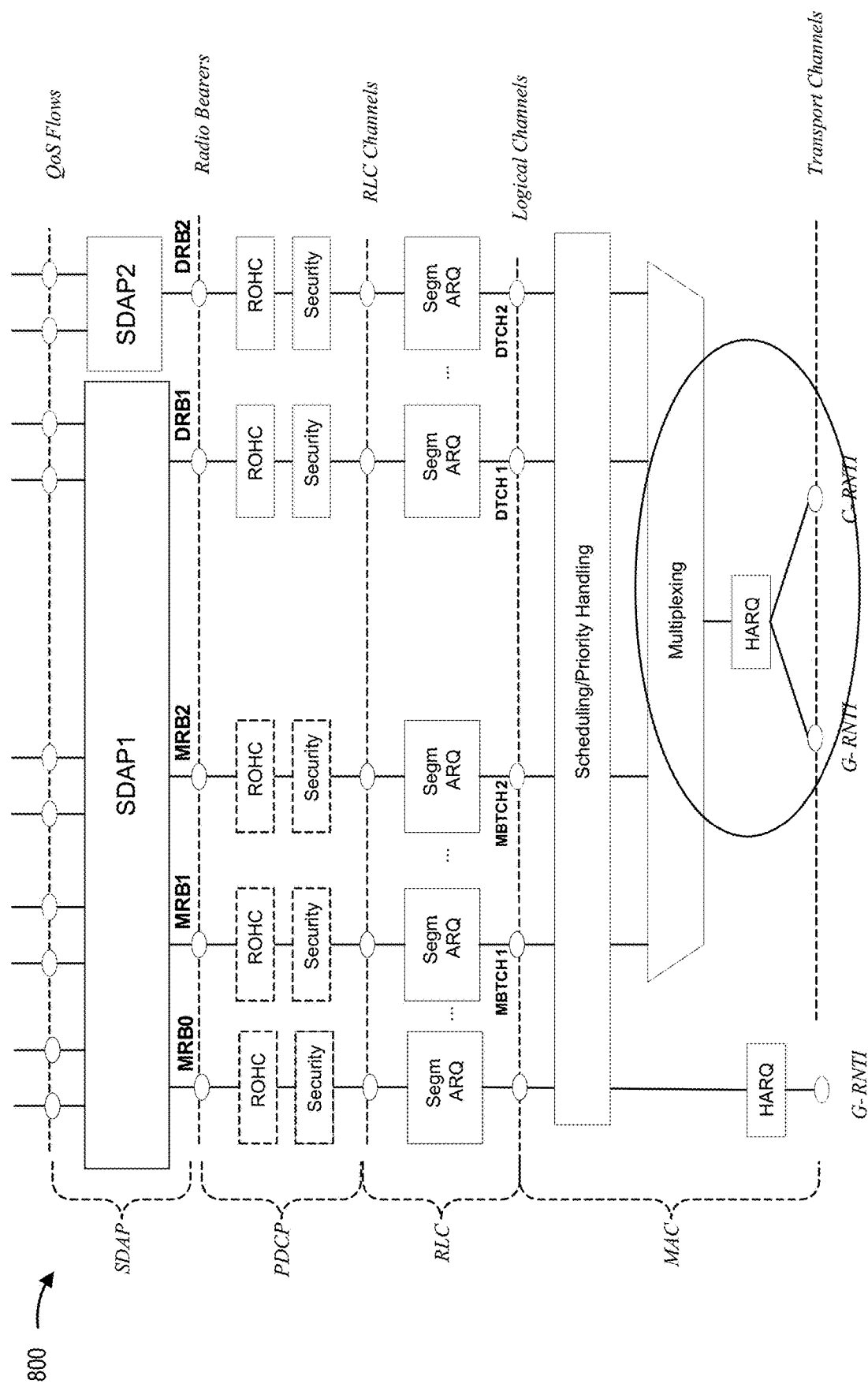
FIG. 8 is a block diagram illustrating an example architecture for selecting a radio bearer mode at a MAC layer of a base station, in accordance with aspects of the present disclosure.

In another implementation, the base station selects the radio bearer mode for a HARQ or RLC re-transmission at the MAC layer. FIG. 8 is a block diagram illustrating an example architecture 800 for selecting a radio bearer mode at a MAC layer of a base station, in accordance with aspects of the present disclosure. The architecture 800 of FIG. 8 is based on the architecture 500 described with respect to FIG. 5. In the example of FIG. 8, the RLC layer may support the AM mode or the UM mode. RLC layer re-transmissions may be performed when operating in the AM mode. That is, the base station may initiate an RLC re-transmission in response to receiving RLC layer feedback from the UE. In the example of FIG. 8, the base station may initiate re-transmission of the multicast data at the RLC layer and feed it through the MBTCH (MBTCH2) logical channel to the MAC layer. Thus, the re-transmission of the multicast data may be associated with a single LCID.

In the example of FIG. 8, the logical channels input to the MAC scheduler are output to a multiplexer, such that the MAC layer determines whether to transmit the multicast re-transmission via the unicast channel or the multicast channel. In this implementation, the MAC layer maps an input from MBTCH to the unicast channel or the multicast channel. However, the MAC layer maps an input from DTCH to the unicast channel. In this example, the base station may dynamically switch re-transmissions associated with a same HARQ process between the multicast channel and the unicast channel. That is, for a given multicast HARQ process, the base station re-transmits the multicast data via either the G-RNTI HARQ process or the C-RNTI HARQ process. The unicast HARQ process may only be associated with the C-RNTI. In this example, the UE may soft combine a HARQ re-transmission received via the multicast channel associated with the G-RNTI with a re-transmission received via the unicast channel associated with the C-RNTI.

Figure 9:
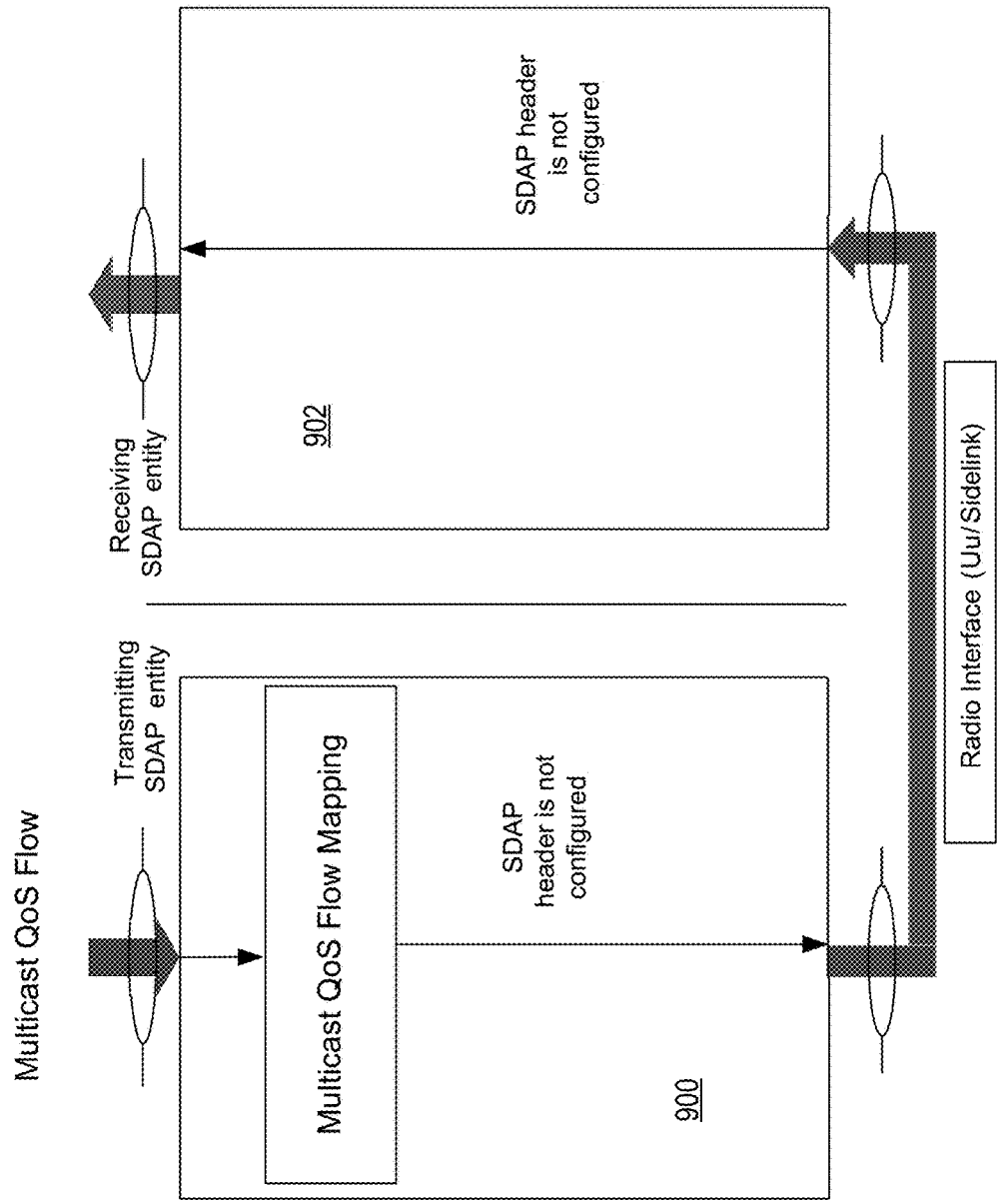
FIG. 9 is a block diagram illustrating an example of a transmitter service data adaptation protocol (SDAP), in accordance with aspects of the present disclosure.

As described above, the SDAP maps multicast QoS flows to either the MRB or the DRB during a multicast PDU session. FIG. 9 is a block diagram illustrating an example of a transmitter SDAP 900, in accordance with aspects of the present disclosure. In the example of FIG. 9, the transmitter SDAP 900 receives a multicast QoS flow from a core network (not shown in FIG. 9) for downlink transmission. The transmitter SDAP 900 maps the multicast QoS flow to the MRB or the DRB.

In one implementation, as described above, the multicast QoS flows may have a one to one mapping to the MRB or the DRB. That is, the transmitter SDAP 900 may individually map each multicast QoS flow to the MRB or the DRB. In another configuration, the transmitter SDAP 900 maps a set of multicast QoS flows to one MRB or one DRB. The base station transmits multicast data of the multicast QoS flows to the UE via a radio interface. The UE may include a receiver SDAP 902.

In the example of FIG. 9, the UE does not transmit uplink data in response to receiving the multicast data. Therefore, the receiver SDAP 902 may not include a reflective QoS. Additionally, an uplink control PDU may be omitted. Furthermore, because the UE does not transmit uplink data in response to receiving the multicast data, the transmitter SDAP 900 may not add an SDAP header to packets.

Figure 10:
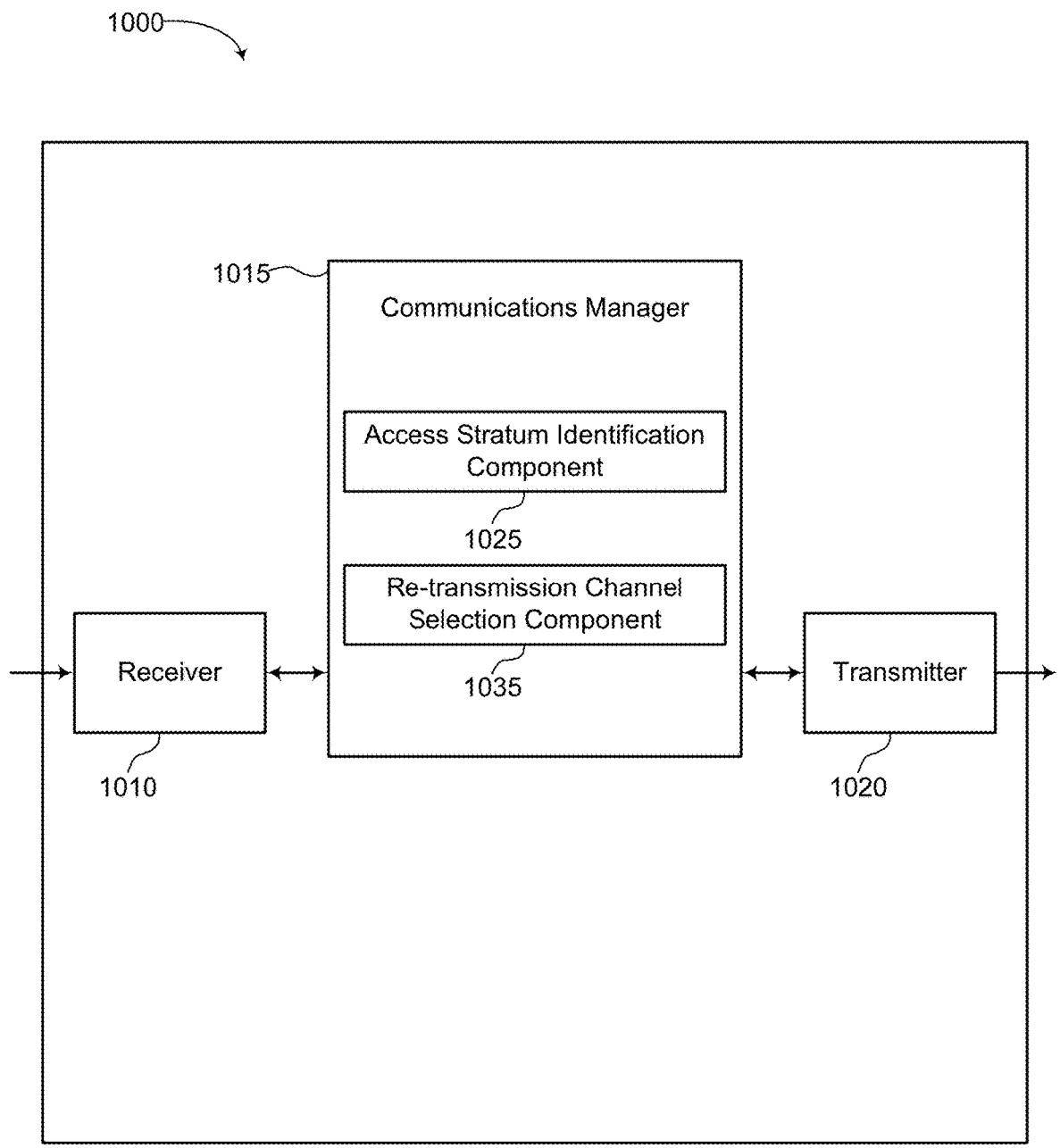
FIG. 10 is a block diagram illustrating an example of a wireless communication device that supports multicast data re-transmissions via a unicast channel or a multicast channel, in accordance with aspects of the present disclosure.

FIG. 10 is a block diagram illustrating an example of a wireless communication device 1000 that supports multicast data re-transmissions via a unicast channel or a multicast channel, in accordance with aspects of the present disclosure. The device 1000 may be an example of aspects of a base station, such as a base station 110a, 110b, 110c, described with reference to FIGS. 1 and 3. The device 1000 may implement an architecture for supporting multicast data re-transmissions via the unicast channel or the multicast channel, such as the architecture 400, 500, 600, 700, and 800 described with reference to FIGS. 4-8, respectively. The wireless communication device 1000 may include a receiver 1010, a communications manager 1015, and a transmitter 1020, which may be in communication with one another (for example, via one or more buses). In some examples, the wireless communication device 1000 is configured to perform operations, including operations of the process 1200 described below with reference to FIG. 12.

In some examples, the wireless communication device 1000 can include a chip, chipset, package, or device that includes at least one processor and at least one modem (for example, a 5G modem or other cellular modem). In some examples, the communications manager 1015, or its sub-components, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more of signals, control information and data information, such as in the form of packets, from one or more other wireless communication devices via various channels including control channels (for example, a physical uplink control channel (PUCCH)) and data channels (for example, a physical uplink shared channel (PUSCH)). The other wireless communication devices may include, but are not limited to, a UE 120 as described with reference to FIG. 1. In aspects of the present disclosure, the wireless communication device 1000 may forward and receive information via a backhaul connection.

The device 1000 may pass received information to other components of the device 1000. The receiver 1010 may be an example of aspects of the receive processor 238 described with reference to FIG. 2. The receiver 1010 may include a set of radio frequency (RF) chains that are coupled with or otherwise utilize a set of antennas (for example, the set of antennas may be an example of aspects of the antennas 234a through 234t described with reference to FIG. 2).

The transmitter 1020 may transmit signals generated by the communications manager 1015 or other components of the wireless communication device 1000. In some examples, the transmitter 1020 may be collocated with the receiver 1010 in a transceiver. The transmitter 1020 may be an example of aspects of the transmit processor 220 described with reference to FIG. 2. The transmitter 1020 may be coupled with or otherwise utilize a set of antennas (for example, the set of antennas may be an example of aspects of the antennas 234a through 234t described with reference to FIG. 2), which may be antenna elements shared with the receiver 1010. In some examples, the transmitter 1020 is configured to transmit control information in a physical downlink control channel (PDCCH) and data in a PDSCH.

The communications manager 1015 may be an example of aspects of the controller/processor 240 described with reference to FIG. 2. The communications manager 1015 includes an access stratum identification component 1025 and a re-transmission channel selection component 1035.

In some implementations, working in conjunction with the transmitter 1020, the communications manager 1015 transmits, to a set of UEs, multicast data via a multicast channel. Working in conjunction with the receiver 1010, the communications manager 1015 receives, from one or more UEs in the set of UEs, feedback based on transmitting the multicast data. The communications manager 1015 may forward the feedback to the access stratum identification component 1025 to identify a first access stratum layer associated with the feedback. The access stratum identification component 1025 may forward the identified first access stratum layer to the re-transmission channel selection component 1035 to select a unicast channel or the multicast channel for re-transmitting the multicast data. The unicast channel or the multicast channel may be selected at a second access stratum layer. The second access stratum layer may be selected based on the identified first access stratum layer. Working in conjunction with the transmitter 1020 and the communications manager 1015, the re-transmission channel selection component 1035 re-transmits, to the one or more UEs, the second multicast data via the multicast channel or the unicast channel based on one or more of a number of UEs served by the base station, a number of multicast feedback transmissions from the set of UEs, or a radio channel condition.

Figure 11:
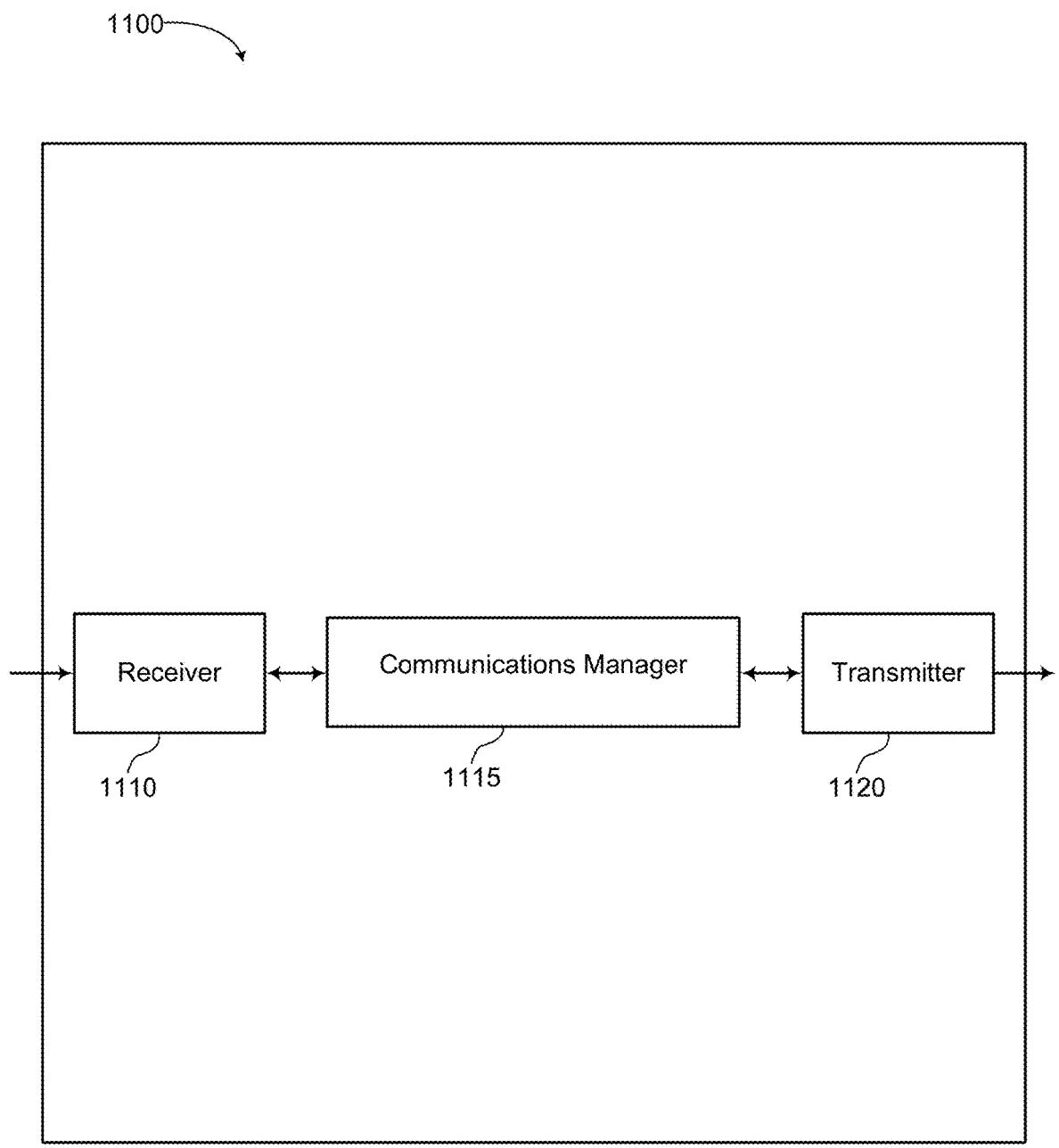
FIG. 11 is a block diagram illustrating an example of a wireless communication device that supports receiving a multicast data re-transmission via a multicast channel or a unicast channel, in accordance with aspects of the present disclosure.

FIG. 11 is a block diagram illustrating an example of a wireless communication device 1100 that supports receiving a multicast data re-transmission via a multicast channel or a unicast channel, in accordance with aspects of the present disclosure. The device 1100 may be an example of aspects of a UE 120a, 120b, 120c, 120d, or 120e described with reference to FIGS. 1 and 3. The wireless communication device 1100 may include a receiver 1110, a communications manager 1115, and a transmitter 1120, which may be in communication with one another (for example, via one or more buses). In some examples, the wireless communication device 1100 is configured to perform operations including operations of the process 1300 described below with reference to FIG. 13.

In some examples, the wireless communication device 1100 can include a chip, chipset, package, or device that includes at least one processor and at least one modem (for example, a 5G modem or other cellular modem). In some examples, the communications manager 1115, or its sub-components, may be separate and distinct components. In some examples, at least some components of the communications manager 1115 are implemented at least in part as software stored in a memory. For example, portions of one or more of the components of the communications manager 1115 can be implemented as non-transitory code executable by the processor to perform the functions or operations of the respective component.

The receiver 1110 may receive one or more of reference signals (for example, periodically configured channel-state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH) and data channels (for example, a PDSCH). The other wireless communication devices may include, but are not limited to, a base station 110 described with reference to FIGS. 1 and 3.

The received information may be passed on to other components of the device 1100. The receiver 1110 may be an example of aspects of the receive processor 258 described with reference to FIG. 2. The receiver 1110 may include a set of RF chains that are coupled with or otherwise utilize a set of antennas (for example, the set of antennas may be an example of aspects of the antennas 252a through 252r described with reference to FIG. 2).

The transmitter 1120 may transmit signals generated by the communications manager 1115 or other components of the wireless communication device 1100. In some examples, the transmitter 1120 may be collocated with the receiver 1110 in a transceiver. The transmitter 1120 may be an example of aspects of the transmit processor 264 described with reference to FIG. 2. The transmitter 1120 may be coupled with or otherwise utilize a set of antennas (for example, the set of antennas may be an example of aspects of the antennas 252a through 252r described with reference to FIG. 2), which may be antenna elements shared with the receiver 1110. In some examples, the transmitter 1120 is configured to transmit control information in a PUCCH and data in a PUSCH.

The communications manager 1115 may be an example of aspects of the controller/processor 280 described with reference to FIG. 2. In one implementation, working in conjunction with the receiver 1110, the communications manager 1115 may be configured to receive, from a base station, such as the base station 110 described with reference to FIGS. 1 and 3, multicast data via a multicast channel. Working in conjunction with the transmitter 1120, the communications manager 1115 may be configured to transmit, to the base station, multicast feedback in response to receiving the multicast data. The communication device 1100 may be associated with a set of UEs, and the set of UEs may be associated with a multicast transmission of the multicast data. Additionally, working in conjunction with the receiver 1110, the communications manager 1115 may be configured to receive, from the base station, a re-transmission of the multicast data via the multicast channel or a unicast channel based one or more of a number of UEs served by the base station, a number of multicast feedback transmissions from the set of UEs, or a radio channel condition.

Figure 12:
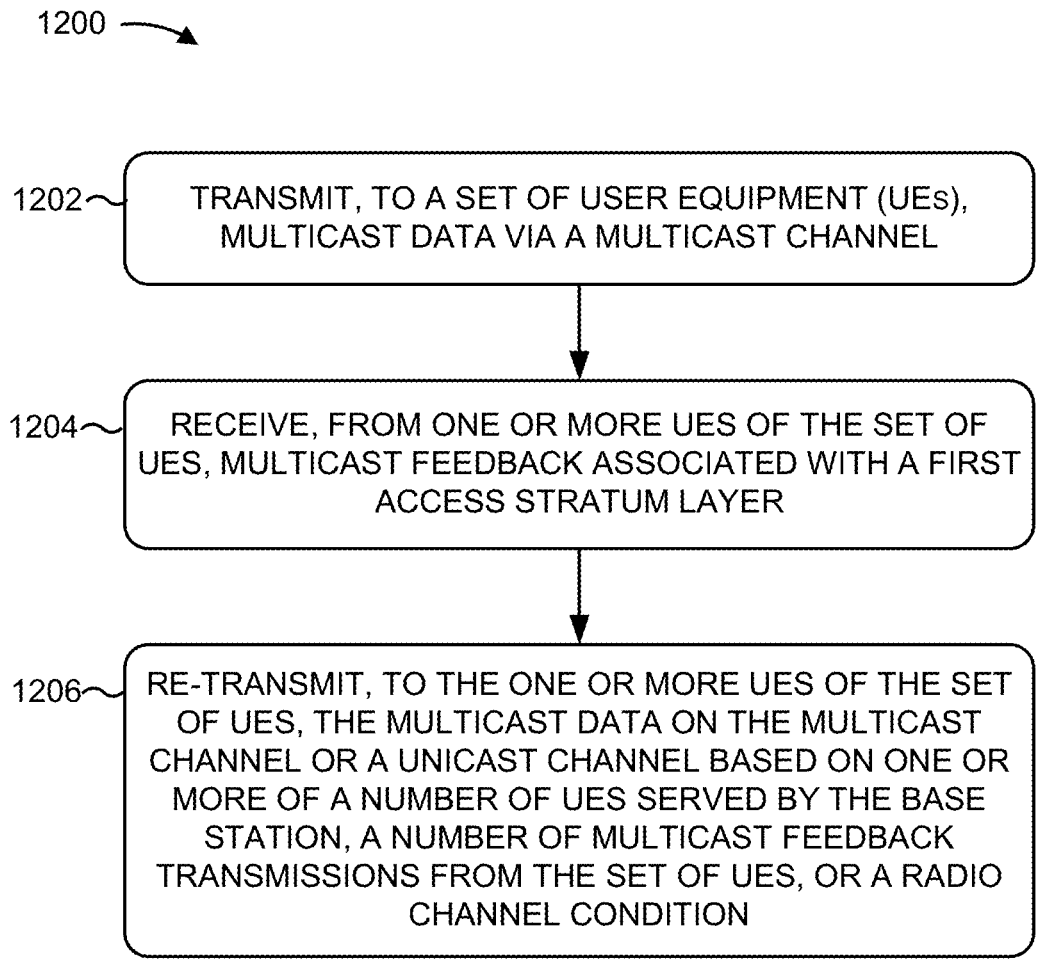
FIG. 12 is a flow diagram illustrating an example process performed at a base station that supports re-transmitting multicast data via a unicast channel or a multicast channel, in accordance with various aspects of the present disclosure.

FIG. 12 is a flow diagram illustrating an example process 1200 performed at a base station that supports re-transmitting multicast data via a unicast channel or a multicast channel, in accordance with various aspects of the present disclosure. The example process 1200 is an example of re-transmitting multicast data via a unicast channel or a multicast channel in accordance with aspects of the present disclosure. The operations of the process 1200 may be implemented by a base station, such as a base station 110a, 110b, or 110c, or its components, described with reference to FIGS. 1 and 3. For example, operations of the process 1200 may be performed by a communications manager 1015 as described with reference to FIG. 10. In some examples, a base station may execute a set of instructions to control the functional elements of the base station to perform the operations or functions described below. Additionally, or alternatively, a base station may perform aspects of the operations or functions described below using special-purpose hardware.

In block 1202, the process 1200 transmits, to a set of UEs, multicast data via a multicast channel. In block 1204, the base station receives, from one or more UEs of the set of UEs, multicast feedback associated with a first access stratum layer. In some examples, the multicast feedback is received based on transmitting the multicast data. In block 1206, the process 1200 re-transmits, to the one or more UEs of the set of UEs, the multicast data on the multicast channel or a unicast channel based on one or more of a number of UEs served by the base station, a number of multicast feedback transmissions from the set of UEs (for example, a number of UEs from the set of UEs that transmit multicast feedback based on receiving the multicast data on the multicast channel), or a radio channel condition. In some examples, the multicast channel or the unicast channel is selected at a second access stratum layer based on identifying the first access stratum layer. Additionally, in some examples, each of the unicast channel and the multicast channel may be associated with different radio bearer mode. Thus, in some examples, the base station may use the unicast channel or the multicast channel for re-transmitting the multicast data based on selecting, or switching, a radio bearer mode.

Figure 13:
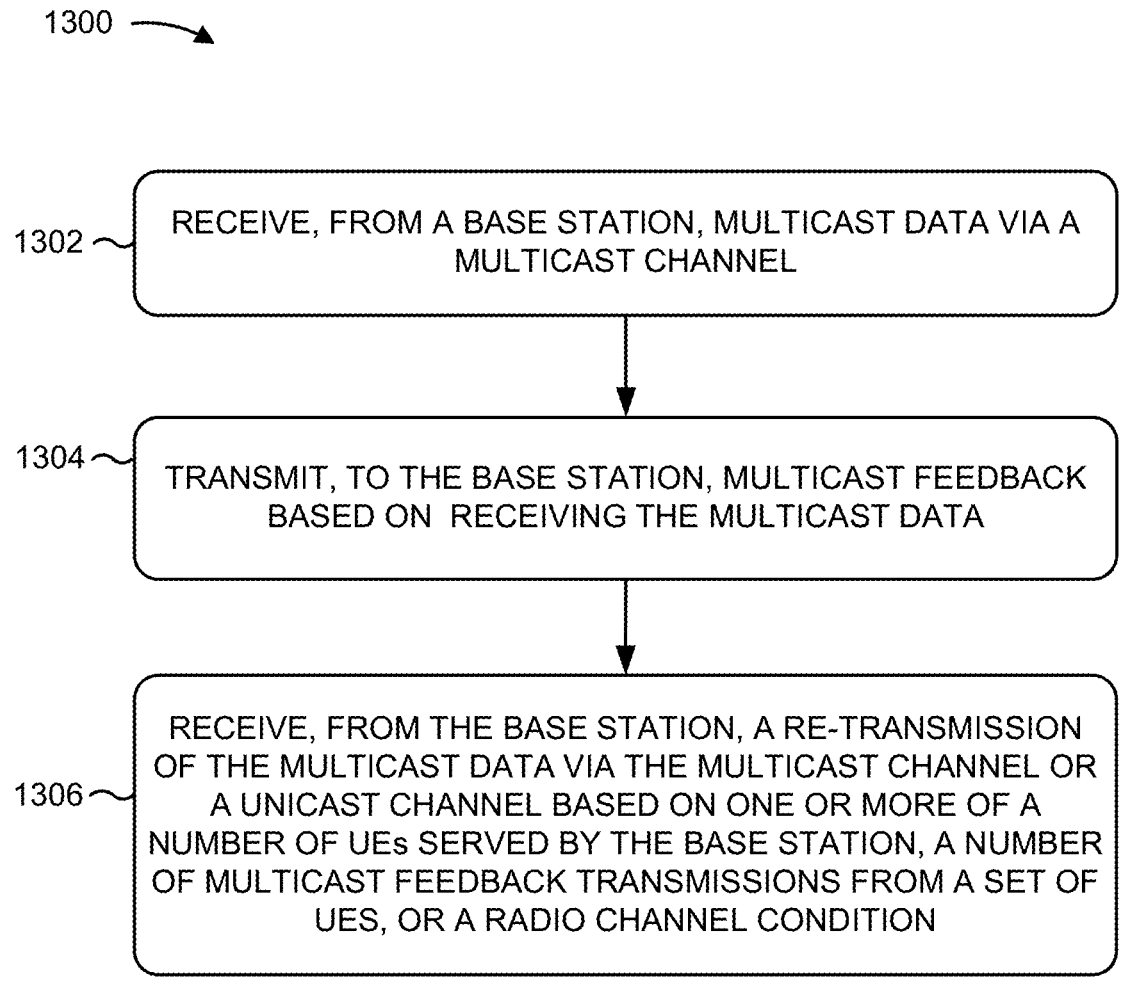
FIG. 13 is a flow diagram illustrating an example process performed at a UE that supports receiving re-transmitted multicast data via a unicast channel or a multicast channel, in accordance with various aspects of the present disclosure.

FIG. 13 is a flow diagram illustrating an example process 1300 performed at a UE that supports receiving re-transmitted multicast data via a unicast channel or a multicast channel, in accordance with various aspects of the present disclosure. The example process 1300 is an example of receiving re-transmitted multicast data via a unicast channel or a multicast channel in accordance with aspects of the present disclosure. The operations of the process 1300 may be implemented by a UE, such as a UE 120a, 120b, 120c, 120d, or 120e, or its components, described with reference to FIGS. 1 and 3. For example, operations of the process 1300 may be performed by a communications manager 1115 as described with reference to FIG. 11. In some examples, a UE may execute a set of instructions to control the functional elements of the UE to perform the operations or functions described below. Additionally, or alternatively, a UE may perform aspects of the operations or functions described below using special-purpose hardware.

In block 1302, the process 1300, receives from a base station, multicast data via a multicast channel. In block 1304, the UE transmits, to the base station, multicast feedback based on receiving the multicast data. In some aspects, the UE is associated with a set of UEs, and the set of UEs are associated with a multicast transmission of the multicast data from the base station. In block 1306, the UE receives, from the base station, a re-transmission of the multicast data on the multicast channel or a unicast channel based on one or more of a number of UEs served by the base station, a number of multicast feedback transmissions from the set of UEs (for example, a number of UEs from the set of UEs that transmit multicast feedback based on receiving the multicast data on the multicast channel), or a radio channel condition. In some examples, the multicast data is received on the multicast channel based on one or more of the number of UEs served by the base station being greater than or equal to a served UE threshold, the number of multicast feedback transmissions from the set of UEs being greater than or equal to a UE feedback threshold, or the radio channel condition satisfying a multicast re-transmission criteria. In some other examples, the re-transmission of the multicast data is received on the unicast channel based on one or more of the number of UEs served by the base station being less than a served UE threshold, the number of multicast feedback transmissions from the set of UEs being less than a UE feedback threshold, or the radio channel condition satisfying unicast re-transmission criteria.

The following provides an overview of some Aspects of the present disclosure:

Aspect 1. A method for wireless communication at a UE, comprising: receiving, from a base station, multicast data via a multicast channel; transmitting, to the base station, multicast feedback based on receiving the multicast data, the UE associated with a set of UEs, and the set of UEs associated with a multicast transmission of the multicast data from the base station; and receiving, from the base station, a re-transmission of the multicast data on the multicast channel or a unicast channel based on one or more of a number of UEs served by the base station, a number of multicast feedback transmissions from the set of UEs, or a radio channel condition.

Aspect 2. The method of Aspect 1, wherein the re-transmission is one re-transmission of a plurality of re-transmissions associated with a hybrid automatic repeat request (HARQ) process.

Aspect 3. The method of Aspect 2, further comprising receiving each re-transmission of the plurality of re-transmissions on only one of the multicast channel or the unicast channel.

Aspect 4. The method of Aspect 2, further comprising receiving each re-transmission of the plurality of re-transmissions on either the multicast channel or the unicast channel.

Aspect 5. The method of Aspect 4, further comprising combining multicast data of each re-transmission of the plurality of re-transmissions.

Aspect 6. The method of any one of Aspects 1-5, wherein the multicast channel is associated with a multicast logical channel ID and the unicast channel is associated with a unicast logical channel ID.

Aspect 7. The method of any one of Aspects 1-6, wherein the multicast channel and the unicast channel are associated with a single logical channel ID Aspect 8. The method of any one of Aspects 1-7, wherein the multicast data lacks a downlink service data adaptation protocol (SDAP) header.

Aspect 9. The method of any one of Aspects 1-7, wherein the re-transmission of the multicast data is received on the multicast channel based on, the number of UEs served by the base station being greater than or equal to a served UE threshold, the number of multicast feedback transmissions from the set of UEs being greater than or equal to a feedback threshold, or the radio channel condition satisfying a multicast re-transmission criterion.

Aspect 10. The method of any one of Aspects 1-8, wherein the re-transmission of the multicast data is received on the unicast channel based on, the number of UEs served by the base station being less than a served UE threshold, the number of multicast feedback transmissions from the set of UEs being less than a feedback threshold, or the radio channel condition satisfying a unicast re-transmission criterion.

Aspect 11. A method for wireless communication at a base station, comprising: transmitting, to a set of user equipment (UEs), multicast data via a multicast channel; receiving, from one or more UEs of the set of UEs, multicast feedback associated with a first access stratum layer, the feedback being received based on transmitting the multicast data; and re-transmitting, to the one or more UEs of the set of UEs, the multicast data on the multicast channel or a unicast channel based on one or more of a number of UEs served by the base station, a number of multicast feedback transmissions from the set of UEs, or a radio channel condition, the multicast channel or the unicast channel being selected at a second access stratum layer based on identifying the first access stratum layer.

Aspect 12. The method of Aspect 11, further comprising: receiving, from a core network, a message requesting the base station to transmit the multicast data to the set of UEs during a multicast protocol data unit (PDU) session; mapping the multicast data to a multicast data quality of service (QoS) flow of the multicast PDU session; and mapping, at a service data adaptation protocol (SDAP) entity of the base station, the multicast data QoS flow to a multicast radio bearer (MRB) or a unicast data radio bearer (DRB).

Aspect 13. The method of Aspect 12, wherein: the multicast data QoS flow is one of a plurality of multicast data QoS flows of the multicast PDU session; and the method further comprises: mapping a set of the plurality of multicast data QoS flows to the MRB or the DRB; or individually mapping each of the plurality of multicast data QoS flows to the MRB or the DRB.

Aspect 14. The method of Aspect 12, further comprising transmitting the multicast data via the multicast channel based on mapping the multicast data QoS flow to the MRB.

Aspect 15. The method of any one of Aspects 12-14, wherein the MRB is associated with the set of UEs and the DRB is associated with a single UE.

Aspect 16. The method of any one of Aspects 12-15, further comprising excluding, at the SDAP entity, a downlink SDAP header from the multicast data.

Aspect 17. The method of any one of Aspects 11-16, further comprising: transmitting, to the set of UEs, radio resource control (RRC) signaling or medium access control (MAC)-control element (CE) signaling indicating a switch from a first radio bearer to a second radio bearer; and switching from the first radio bearer to the second radio bearer based on transmitting the RRC signaling or the MAC-CE signaling.

Aspect 18. The method of any one of Aspects 11-17, wherein: the first access stratum layer comprises a radio link control (RLC) layer or a medium access control (MAC) layer; the second access stratum layer comprises the MAC layer; and the method further comprises associating the re-transmission with a single logical channel ID of an RLC entity of the base station.

Aspect 19. The method of any one of Aspects 11-17 wherein: the first access stratum layer comprises a radio link control (RLC) layer; the second access stratum layer comprises the RLC layer; and the method further comprises: associating the re-transmission with a unicast logical channel ID based on selecting the unicast channel for the re-transmission; or associating the re-transmission with a multicast logical channel ID based on selecting the second multicast channel for the re-transmission.

Aspect 20. The method of any one of Aspects 11-17, wherein: the first access stratum layer comprises a radio link control (RLC) layer or a medium access control (MAC) layer; the second access stratum layer comprises the MAC layer; and the method further comprises dynamically selecting the unicast channel or the second multicast channel at a hybrid automatic repeat request (HARQ) entity at the MAC layer.

Aspect 21. The method of any one of Aspect 11-20, further comprising: scrambling the multicast channel with a group radio network temporary identifier (G-RNTI) based on selecting the multicast channel for the re-transmission; or scrambling the unicast channel with a cell radio network temporary identifier (C-RNTI) based on selecting the unicast channel for the re-transmission.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and a combination of hardware and software. As used, a processor is implemented in hardware, firmware, and a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and the like.

It will be apparent that systems and methods described may be implemented in different forms of hardware, firmware, and a combination of hardware and software. The actual specialized control hardware or software code used to implement these systems and methods is not limiting of the aspects. Thus, the operation and behavior of the systems and methods were described without reference to specific software code—it being understood that software and hardware can be designed to implement the systems and methods based, at least in part, on the description.

Even though particular combinations of features are recited in the claims and disclosed in the specification, these combinations are not intended to limit the disclosure of various aspects. In fact, many of these features may be combined in ways not specifically recited in the claims and disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and the like), and may be used interchangeably with "one or more." Where only one item is intended, the phrase "only one" or similar language is used. Also, as used, the terms "has," "have," "having," and the like are intended to be open-ended terms. Further, the phrase "based on" is intended to mean "based, at least in part, on" unless explicitly stated otherwise.

What is claimed is:

1. A method for wireless communication at a user equipment (UE), comprising:
   receiving, from a base station via a multicast physical downlink shared channel (PDSCH), multicast data associated with a multicast session, the multicast PDSCH being scrambled with a group radio network temporary identifier (G-RNTI), the multicast session being associated with a quality of service (QOS) level;
   transmitting, to the base station, multicast feedback based on receiving the multicast data, the UE associated with a set of UEs, the set of UEs associated with a multicast transmission of the multicast data from the base station; and
   receiving, from the base station, a group of re-transmissions of the multicast data, the group of re-transmissions including a first set of re-transmissions on a unicast PDSCH scrambled with a cell radio network temporary identifier (C-RNTI) in accordance with the QoS level and a total number of UEs joined on the multicast session being less than a total UE threshold.

2. The method of claim 1, wherein each re-transmission of the group of re-transmissions is associated with a hybrid automatic repeat request (HARQ) process.

3. The method of claim 1, further comprising soft-combining the multicast data of each re-transmission of the group of re-transmissions.

4. The method of claim 1, wherein the multicast PDSCH is associated with a multicast logical channel ID and the unicast PDSCH is associated with a unicast logical channel ID.

5. The method of claim 1, wherein the multicast PDSCH and the unicast PDSCH are associated with a single logical channel ID.

6. The method of claim 1, wherein the multicast data lacks a downlink service data adaptation protocol (SDAP) header.

7. The method of claim 1, wherein the group of re-transmissions includes a second set of re-transmissions scrambled with the G-RNTI used for an initial transmission of the multicast data in accordance with the total number of UEs joined on the multicast session satisfying a second condition.

8. The method of claim 7, wherein the second condition is satisfied in accordance with the total number of UEs joined on the multicast session being greater than or equal to the total UE threshold.

9. The method of claim 7, wherein the group of re-transmissions is dynamically switched between a first re-transmission in the first set of re-transmissions and a second re-transmission in the second set of re-transmissions, or vice versa.

10. An apparatus for wireless communications at a user equipment (UE), comprising:
    at least one processor;
    at least one memory coupled with the at least one processor; and
    instructions stored in the at least one memory and operable, when executed by the at least one processor, to cause the apparatus to:
      receive, from a base station via a multicast physical downlink shared channel (PDSCH), multicast data associated with a multicast session, the multicast PDSCH being scrambled with a group radio network temporary identifier (G-RNTI), the multicast session being associated with a quality of service (QOS) level (G-RNTI);
      transmit, to the base station, multicast feedback based on receiving the multicast data, the UE associated with a set of UEs, the set of UEs associated with a multicast transmission of the multicast data from the base station;
      receive, from the base station, a group of re-transmissions of the multicast data, the group of re-transmissions including a first set of re-transmissions on a unicast PDSCH scrambled with a cell radio network temporary identifier (C-RNTI) in accordance with the QoS level and a total number of UEs joined on the multicast session being less than a total UE threshold.

11. The apparatus of claim 10, wherein the group of re-transmissions includes a second set of re-transmissions scrambled with the G-RNTI used for an initial transmission of the multicast data in accordance with the total number of UEs joined on the multicast session satisfying a second condition.

12. The apparatus of claim 11, wherein the second condition is satisfied in accordance with the total number of UEs joined on the multicast session being greater than or equal to the total UE threshold.

13. The apparatus of claim 11, wherein the group of re-transmissions is dynamically switched between a first re-transmission in the first set of re-transmissions and a second re-transmission in the second set of re-transmissions, or vice versa.

\* \* \* \* \*